United States Defensive Publication

[19] (H) [11] T957,005

Gorman [43] Apr. 5, 1977

[54] BLOCK COPOLYMER PARTICLE FORMING PROCESS

[76] Inventor: John E. Gorman, 5422 Olympia Fields Lane, Houston, Tex. 77069

[21] Appl. No.: 696,257

[22] Filed: June 15, 1976

Related U.S. Application Data

[63] Continuation-in-part of Ser. No. 597,101, July 18, 1975, abandoned.

[51] Int. Cl.[2] ..... B29B 1/03

[52] U.S. Cl. ..... 264/140; 264/142; 264/178 F

[57] ABSTRACT

A process is provided for the formation of block copolymer particles having a reduced tendency to agglomerate which comprises extruding the block copolymer into a water bath in the presence of water-dispersible polyvalent metal salts of higher fatty acids and/or water-dispersible surfactants and forming nibs, pellets or strands in the bath. Suitable water soluble surfactants include anionic, cationic and non-ionic surfactants. Especially contemplated is the use of zinc stearate as the surfactant.

5 Claims, No Sheets Drawing,

8 Pages Specification

The file of this unexamined application may be inspected and copies thereof may be purchased (849 O.G. 1221, Apr. 9, 1968).